United States Patent
Sasaki

(10) Patent No.: US 11,807,698 B2
(45) Date of Patent: Nov. 7, 2023

(54) BINDER FOR NON-AQUEOUS SECONDARY BATTERY POROUS MEMBRANE-USE, COMPOSITION FOR NON-AQUEOUS SECONDARY BATTERY POROUS MEMBRANE-USE, POROUS MEMBRANE FOR NON-AQUEOUS SECONDARY BATTERY-USE, AND NON-AQUEOUS SECONDARY BATTERY

(71) Applicant: ZEON CORPORATION, Tokyo (JP)

(72) Inventor: Tomokazu Sasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 25 days.

(21) Appl. No.: 15/117,639

(22) PCT Filed: Feb. 24, 2015

(86) PCT No.: PCT/JP2015/000938
§ 371 (c)(1),
(2) Date: Aug. 9, 2016

(87) PCT Pub. No.: WO2015/145967
PCT Pub. Date: Oct. 1, 2015

(65) Prior Publication Data
US 2016/0351873 A1 Dec. 1, 2016

(30) Foreign Application Priority Data
Mar. 24, 2014 (JP) .................................. 2014-060528

(51) Int. Cl.
| | | |
|---|---|---|
| *C08F 212/08* | (2006.01) | |
| *H01M 50/446* | (2021.01) | |
| *H01M 50/417* | (2021.01) | |
| *H01M 50/423* | (2021.01) | |
| *H01M 4/62* | (2006.01) | |
| *C08L 33/08* | (2006.01) | |
| *H01M 50/46* | (2021.01) | |
| *C08F 220/18* | (2006.01) | |
| *C08F 220/68* | (2006.01) | |
| *C08K 3/22* | (2006.01) | |
| *H01M 10/05* | (2010.01) | |
| *H01M 10/0566* | (2010.01) | |
| *H01M 10/0525* | (2010.01) | |

(52) U.S. Cl.
CPC ...... *C08F 212/08* (2013.01); *C08F 220/1808* (2020.02); *C08F 220/68* (2013.01); *C08K 3/22* (2013.01); *C08L 33/08* (2013.01); *H01M 4/622* (2013.01); *H01M 10/05* (2013.01); *H01M 50/417* (2021.01); *H01M 50/423* (2021.01); *H01M 50/446* (2021.01); *H01M 50/46* (2021.01); *C08K 2003/2227* (2013.01); *H01M 10/0525* (2013.01); *H01M 10/0566* (2013.01)

(58) Field of Classification Search
CPC . C08F 212/08; H01M 50/417; H01M 50/446; H01M 50/423
See application file for complete search history.

(56) References Cited

U.S. PATENT DOCUMENTS

| | | | |
|---|---|---|---|
| 2005/0069769 A1* | 3/2005 | Nakayama | H01M 4/13 252/182.1 |
| 2007/0009803 A1* | 1/2007 | Kim | H01M 2/145 429/251 |
| 2008/0003506 A1* | 1/2008 | Suzuki | H01M 4/13 526/318.5 |
| 2011/0091774 A1 | 4/2011 | Wakizaka et al. | |
| 2011/0318630 A1* | 12/2011 | Wakizaka | H01M 2/1653 429/144 |
| 2012/0189911 A1* | 7/2012 | Kang | H01M 4/622 429/211 |
| 2013/0130123 A1* | 5/2013 | Kaneda | H01M 2/16 429/233 |
| 2013/0273421 A1* | 10/2013 | Matsumura | H01M 50/461 429/246 |
| 2013/0323569 A1* | 12/2013 | Yeou | H01M 2/145 429/144 |
| 2013/0330590 A1 | 12/2013 | Toyoda | |
| 2014/0255788 A1* | 9/2014 | Seki | H01M 4/668 361/502 |
| 2014/0272574 A1* | 9/2014 | Son | H01M 4/622 429/217 |
| 2015/0270523 A1* | 9/2015 | Toyoda | H01M 2/145 429/145 |
| 2015/0333308 A1 | 11/2015 | Toyoda et al. | |

FOREIGN PATENT DOCUMENTS

| | | |
|---|---|---|
| CN | 103069612 A | 4/2013 |
| CN | 104685673 A | 6/2015 |

(Continued)

OTHER PUBLICATIONS

Sep. 27, 2016, International Preliminary Report on Patentability issued in the International Patent Application No. PCT/JP2015/000938.

*Primary Examiner* — Jonathan G Jelsma
(74) *Attorney, Agent, or Firm* — KENJA IP LAW PC

(57) ABSTRACT

Provided is a binder for non-aqueous secondary battery porous membrane-use that enables formation of a porous membrane having excellent durability and that can improve stability under high shear of a composition for porous membrane-use. The binder for non-aqueous secondary battery porous membrane-use includes a particulate polymer. The particulate polymer is a random copolymer including at least 35 mass % of an alkyl (meth)acrylate monomer unit and at least 20 mass % and no greater than 65 mass % of an aromatic monovinyl monomer unit. A degree of swelling of the particulate polymer with respect to a non-aqueous electrolysis solution is greater than a factor of 1 and no greater than a factor of 2.

7 Claims, No Drawings

(56) References Cited

FOREIGN PATENT DOCUMENTS

| | | | |
|---|---|---|---|
| EP | 2908364 A1 | 8/2015 | |
| JP | 2013145763 A | 7/2013 | |
| JP | WO2014050708 * | 4/2014 | ............ H01M 2/16 |
| KR | 1020140004156 A | 1/2014 | |
| WO | 2009123168 A1 | 10/2009 | |
| WO | 2010134501 A1 | 11/2010 | |
| WO | 2013151144 A1 | 10/2013 | |

* cited by examiner

BINDER FOR NON-AQUEOUS SECONDARY BATTERY POROUS MEMBRANE-USE, COMPOSITION FOR NON-AQUEOUS SECONDARY BATTERY POROUS MEMBRANE-USE, POROUS MEMBRANE FOR NON-AQUEOUS SECONDARY BATTERY-USE, AND NON-AQUEOUS SECONDARY BATTERY

TECHNICAL FIELD

The present disclosure relates to a binder for non-aqueous secondary battery porous membrane-use, a composition for non-aqueous secondary battery porous membrane-use, a porous membrane for non-aqueous secondary battery-use, and a non-aqueous secondary battery.

BACKGROUND

Non-aqueous secondary batteries (hereinafter, also abbreviated as "secondary batteries") such as lithium ion secondary batteries have characteristics such as compact size, light weight, high energy density, and rechargeability, and are used in a wide variety of applications. A secondary battery normally includes battery components such as a positive electrode, a negative electrode, and a separator that separates the positive electrode and the negative electrode, and prevents short-circuiting between the positive electrode and the negative electrode. In some secondary batteries, porous membranes are provided on the electrodes (positive electrode and negative electrode) and the separator as protective layers with an objective of improving heat resistance and strength of these battery components.

A porous membrane such as described above can for example be formed by non-conductive particles, such as organic particles or inorganic particles, bound by a binder. The porous membrane is typically produced by preparing a slurry composition (hereinafter, also referred to as a "composition for porous membrane-use") containing porous membrane materials, such as the non-conductive particles and the binder, that are dissolved or dispersed in a dispersion medium, such as water, applying the composition for porous membrane-use onto a substrate, such as an electrode or a separator, and drying the applied composition for porous membrane-use.

In recent years, there has been a large amount of activity directed toward improving porous membranes with an objective of providing non-aqueous secondary batteries having even higher performance (for example, refer to PTL 1 and 2).

In one specific example, PTL 1 proposes that rate characteristics and high-temperature characteristics of a non-aqueous secondary battery can be improved by adopting a porous membrane for secondary battery-use that includes from 50 mass % to 99 mass % of non-conductive particles and from 0.1 mass % to 10 mass % of a graft polymer that has a degree of swelling with respect to an electrolysis solution of at least 100% and no greater than 300%.

In another specific example, PTL 2 proposes that close adherence between a porous membrane and an electrode can be ensured, and cycle characteristics of a secondary battery can be improved as a result of the porous membrane including a water-soluble polymer, inorganic particles, and a particulate polymer including from 0.5 mass % to 40 mass % of a hydrophilic group-containing monomer unit.

CITATION LIST

Patent Literature

PTL 1: WO 2010/134501 A1
PTL 2: WO 2009/123168 A1

SUMMARY

Technical Problem

In recent years, there has been demand for further improvement in performance of non-aqueous secondary batteries. Specifically, there has been demand for a non-aqueous secondary battery that displays excellent durability even when used under harsh conditions, such as when the secondary battery is mounted in an electric vehicle where large vibrations are continuously imparted on the secondary battery during use. Consequently, there is also demand for a porous membrane that has further improved durability in an electrolysis solution when mounted in a non-aqueous secondary battery.

However, the conventional techniques described above have not been able to provide a porous membrane having adequate durability and have, therefore, not been able to provide a non-aqueous secondary battery having a sufficiently high level of durability.

Furthermore, when a composition for porous membrane-use that is used to form a porous membrane is for example applied by a gravure coating apparatus during formation of the porous membrane on a substrate, the composition for porous membrane-use receives high shear force due to rotation of a gravure roll. However, a composition for porous membrane-use that is conventionally used to form a porous membrane suffers from a problem of having poor dispersion stability upon receiving high shear force, and thus in a situation in which porous membrane formation is carried out over a long period or rotational speed of a gravure roller is increased in order to carry out high-speed formation, aggregation of components occurs in the composition for porous membrane-use, making it difficult to obtain a porous membrane of uniform thickness.

An objective of the present disclosure is to provide a binder for non-aqueous secondary battery porous membrane-use that enables formation of a porous membrane having excellent durability and that can improve stability under high shear of a composition for porous membrane-use.

Another objective of the present disclosure is to provide a composition for non-aqueous secondary battery porous membrane-use that has excellent stability under high shear and that enables formation of a porous membrane having excellent durability.

A further objective of the present disclosure is to provide a porous membrane for non-aqueous secondary battery-use that has excellent durability and a non-aqueous secondary battery including the porous membrane for non-aqueous secondary battery-use.

Solution to Problem

The inventor conducted diligent investigation with the objective of solving the problem described above. The inventor discovered that it is possible to ensure stability under high shear of a composition for porous membrane-use and durability of a porous membrane by using, as a binder for porous membrane-use, a particulate polymer that is a random copolymer including an alkyl (meth)acrylate monomer unit and an aromatic monovinyl monomer unit in specific percentages, and having a degree of swelling with respect to a non-aqueous electrolysis solution that is controlled to within a specific range. This discovery led to the present disclosure.

Specifically, in order to advantageously solve the problem described above through the present disclosure, a presently disclosed binder for non-aqueous secondary battery porous membrane-use includes a particulate polymer, wherein the particulate polymer is a random copolymer including at least 35 mass % of an alkyl (meth)acrylate monomer unit and at least 20 mass % and no greater than 65 mass % of an aromatic monovinyl monomer unit, and a degree of swelling of the particulate polymer with respect to a non-aqueous electrolysis solution is greater than a factor of 1 and no greater than a factor of 2. As a result of using the binder including the particulate polymer that is a random copolymer including an alkyl (meth)acrylate monomer unit and an aromatic monovinyl monomer unit in specific percentages and having a degree of swelling with respect to a non-aqueous electrolysis solution that is controlled to within a specific range as described above, it is possible to improve stability under high shear of a composition for porous membrane-use in which the binder is used. Furthermore, a porous membrane formed using the binder can be provided with excellent durability.

In the presently disclosed binder for non-aqueous secondary battery porous membrane-use, the particulate polymer preferably further includes at least 0.1 mass % and no greater than 5 mass % of an acidic group-containing monomer unit. As a result of the particulate polymer including an acidic group-containing monomer unit with a content in the aforementioned range, stability under high shear of a composition for porous membrane-use and durability of a porous membrane can be further improved while restricting increased importation of moisture into a secondary battery. Additionally, electrical characteristics (for example, life characteristics) of a secondary battery including the porous membrane can be improved.

In the presently disclosed binder for non-aqueous secondary battery porous membrane-use, the acidic group-containing monomer unit is preferably a monomer unit derived from an ethylenically unsaturated dicarboxylic acid. As a result of the particulate polymer including a monomer unit derived from an ethylenically unsaturated dicarboxylic acid as the acidic group-containing monomer unit, stability under high shear of a composition for porous membrane-use, durability of a porous membrane, and electrical characteristics of a secondary battery can be sufficiently improved even in a situation in which the percentage content of the acidic group-containing monomer unit is kept small in order to further restrict increased importation of moisture into a secondary battery.

A presently disclosed composition for non-aqueous secondary battery porous membrane-use contains any one of the binders for non-aqueous secondary battery porous membrane-use described above, non-conductive particles, and water. A porous membrane having excellent durability can be obtained by forming the porous membrane using the composition containing any one of the binders for non-aqueous secondary battery porous membrane-use described above. Moreover, the composition containing any one of the binders for non-aqueous secondary battery porous membrane-use described above has excellent stability under high shear and has a low tendency to aggregate during porous membrane formation.

A presently disclosed porous membrane for non-aqueous secondary battery-use is formable from the composition for non-aqueous secondary battery porous membrane-use described above. The porous membrane has excellent durability.

A presently disclosed non-aqueous secondary battery includes a positive electrode, a negative electrode, a separator, and an electrolysis solution, wherein the porous membrane for non-aqueous secondary battery-use described above is provided on a surface of at least one battery component selected from the group consisting of the positive electrode, the negative electrode, and the separator. The non-aqueous secondary battery has excellent durability and high performance.

Advantageous Effect

According to the present disclosure, it is possible to provide a binder for non-aqueous secondary battery porous membrane-use that enables formation of a porous membrane having excellent durability and that can improve stability under high shear of a composition for porous membrane-use.

Moreover, according to the present disclosure, it is possible to provide a composition for non-aqueous secondary battery porous membrane-use that has excellent stability under high shear and that enables formation of a porous membrane having excellent durability.

Furthermore, according to the present disclosure, it is possible to provide a porous membrane for non-aqueous secondary battery-use that has excellent durability and a non-aqueous secondary battery including the porous membrane for non-aqueous secondary battery-use.

DETAILED DESCRIPTION

The following describes embodiments of the present disclosure in detail.

Herein, a presently disclosed binder for non-aqueous secondary battery porous membrane-use is used as a material for preparing a composition for non-aqueous secondary battery porous membrane-use. A presently disclosed composition for non-aqueous secondary battery porous membrane-use is prepared using the presently disclosed binder for non-aqueous secondary battery porous membrane-use. A presently disclosed porous membrane for non-aqueous secondary battery-use is formed using the presently disclosed composition for non-aqueous secondary battery porous membrane-use. A presently disclosed non-aqueous secondary battery includes the presently disclosed porous membrane for non-aqueous secondary battery-use on a surface of at least one battery component.

(Binder for Non-Aqueous Secondary Battery Porous Membrane-Use)

The presently disclosed binder for porous membrane-use is a composition containing a particulate polymer that has binding ability, and optionally containing other components and a dispersion medium such as water. The particulate polymer has at least the following features (1) to (3):
  (1) the particulate polymer includes at least 35 mass % of an alkyl (meth)acrylate monomer unit and at least 20 mass % and no greater than 65 mass % of an aromatic monovinyl monomer unit;
  (2) the particulate polymer is a random copolymer; and
  (3) a degree of swelling of the particulate polymer with respect to a non-aqueous electrolysis solution is greater than a factor of 1 and no greater than a factor of 2.

As used in the present disclosure, the phrase "includes a monomer unit" means that "a polymer obtained with the monomer includes a structural unit derived from the monomer". Furthermore, "(meth)acryl" is used in the present disclosure to indicate "acryl" and/or "methacryl".

A composition for porous membrane-use containing the presently disclosed binder for porous membrane-use has excellent stability under high shear. Moreover, a porous membrane formed using the presently disclosed binder for porous membrane-use has excellent durability.

The following provides a detailed description of the particulate polymer included in the presently disclosed binder for non-aqueous secondary battery porous membrane-use.

<Particulate Polymer>

The particulate polymer ensures strength of a porous membrane obtained therewith and also retains components included in the porous membrane such that these components do not become detached from the porous membrane.

Herein, the particulate polymer is normally a polymer that is present in an aqueous medium in the shape of particles and that is not water-soluble.

[Alkyl (meth)acrylate Monomer Unit]

Examples of alkyl (meth)acrylate monomers that can be used to form the alkyl (meth)acrylate monomer unit include alkyl acrylates such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. From among such examples, the alkyl (meth)acrylate monomer is preferably an alkyl (meth)acrylate for which the carbon number of the alkyl group bonded to the non-carbonyl oxygen atom is at least 4 (for example, 2-ethylhexyl acrylate, butyl acrylate, or octyl acrylate), and is more preferably an alkyl (meth) acrylate for which this carbon number is at least 5 (for example, 2-ethylhexyl acrylate or octyl acrylate), from a viewpoint of reducing porous membrane moisture content and improving secondary battery life characteristics while also improving porous membrane durability. Furthermore, from a viewpoint of reducing the amount of moisture imported into a secondary battery due to the particulate polymer, suppressing decomposition of an electrolyte in an electrolysis solution, and improving secondary battery electrical characteristics (particularly life characteristics), the alkyl (meth)acrylate monomer preferably does not have a hydrophilic group such as an acidic group (for example, a carboxylic acid group, a sulfonate group, a phosphate group, or a hydroxy group).

Any one of such alkyl (meth)acrylate monomers can be used individually or any two or more of such alkyl (meth) acrylate monomers can be used in combination.

The percentage content of the alkyl (meth)acrylate monomer unit in the particulate polymer is required to be at least 35 mass %, is preferably at least 40 mass % and more preferably at least 45 mass %, and is preferably no greater than 80 mass %, more preferably no greater than 75 mass %, further preferably no greater than 70 mass %, particularly preferably no greater than 65 mass %, and most preferably no greater than 60 mass %. As a result of the percentage content of the alkyl (meth)acrylate monomer unit being in the range described above, adhesiveness of the particulate polymer can be improved, the degree of swelling of the particulate polymer with respect to a non-aqueous electrolysis solution can be set at an appropriate level, elution of the particulate polymer into an electrolysis solution can be suppressed, and consequently porous membrane durability can be ensured.

[Aromatic Monovinyl Monomer Unit]

Examples of aromatic monovinyl monomers that can be used to form the aromatic monovinyl monomer unit include styrene, styrene sulfonic acid, salts of styrene sulfonic acid (for example, sodium styrenesulfonate), α-methylstyrene, vinyltoluene, and 4-(tert-butoxy)styrene. Among such examples, styrene and sodium styrenesulfonate are preferable. Furthermore, from a viewpoint of reliably reducing the amount of moisture imported into a secondary battery due to the particulate polymer, suppressing decomposition of an electrolyte in an electrolysis solution, and improving secondary battery electrical characteristics (particularly life characteristics), the aromatic monovinyl monomer preferably does not have a hydrophilic group such as an acidic group (for example, a carboxylic acid group, a sulfonate group, a phosphate group, or a hydroxy group), and the aromatic monovinyl monomer is particularly preferably styrene. Any one of such aromatic monovinyl monomers may be used individually or any two or more of such aromatic monovinyl monomers may be used in combination.

The percentage content of the aromatic monovinyl monomer unit in the particulate polymer is required to be at least 20 mass % and no greater than 65 mass %, is preferably at least 25 mass %, more preferably at least 30 mass %, and further preferably at least 35 mass %, and is preferably no greater than 64.9 mass %, more preferably no greater than 60 mass %, and further preferably no greater than 50 mass %. As a result of the percentage content of the aromatic monovinyl monomer unit being in the range described above, elution of the particulate polymer into an electrolysis solution can be suppressed and porous membrane durability can be increased. Furthermore, stability under high shear of a composition for porous membrane-use containing the binder for porous membrane-use can be improved. Moreover, the amount of moisture imported into a secondary battery due to the particulate polymer can be reduced.

[Other Monomer Units]

The particulate polymer may include other monomer units besides the alkyl (meth)acrylate monomer unit and the aromatic monovinyl monomer unit described above. No specific limitations are placed on other monomer units that can be included and examples thereof include an acidic group-containing monomer unit and a cross-linkable monomer unit.

As explained above, the acidic group-containing monomer unit and the cross-linkable monomer unit are monomer units other than the alkyl (meth)acrylate monomer unit and the aromatic monovinyl monomer unit. Accordingly, the alkyl (meth)acrylate monomers and the aromatic monovinyl monomers (for example, styrene sulfonic acid and salts thereof) described above are not included among acidic group-containing monomers that can be used to form the acidic group-containing monomer unit and cross-linkable monomers that can be used to form the cross-linkable monomer unit.

[[Acidic Group-Containing Monomer Unit]]

Examples of acidic group-containing monomers that can be used to form the acidic group-containing monomer unit include carboxylic acid group-containing monomers, sulfonate group-containing monomers, and phosphate group-containing monomers.

Examples of carboxylic acid group-containing monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids.

Examples of ethylenically unsaturated monocarboxylic acids that can be used include acrylic acid, methacrylic acid, and crotonic acid. Examples of derivatives of ethylenically unsaturated monocarboxylic acids that can be used include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids that can be used include maleic acid, fumaric acid, and itaconic acid. Examples of acid anhydrides of ethylenically unsaturated dicarboxylic acids that can be used include maleic anhydride, acrylic anhydride, methylmaleic anhydride, and dimethylmaleic anhydride. Examples of derivatives of ethylenically unsaturated dicarboxylic acids that can be used include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate.

Examples of sulfonate group-containing monomers that can be used include vinyl sulfonic acid, methyl vinyl sulfonic acid, (meth)allyl sulfonic acid, (meth)acrylic acid-2-ethyl sulfonate, 2-acrylamide-2-methylpropane sulfonic acid, and 3-allyloxy-2-hydroxypropane sulfonic acid.

The term "(meth)allyl" is used in the present disclosure to refer to allyl and/or methallyl.

Examples of phosphate group-containing monomers that can be used include 2-(meth)acryloyloxyethyl phosphate, methyl-2-(meth)acryloyloxyethyl phosphate, and ethyl-(meth)acryloyloxyethyl phosphate.

The term "(meth)acryloyl" is used in the present disclosure to refer to acryloyl and/or methacryloyl.

Among such examples, the acidic group-containing monomer is preferably an acidic group-containing monomer that has at least two acidic groups per molecule. In a situation in which the particulate polymer includes the acidic group-containing monomer unit, the presence of an acidic group can further improve stability under high shear of a composition for porous membrane-use and porous membrane durability, and can also increase the degree of swelling of the particulate polymer with respect to a non-aqueous electrolysis solution and improve secondary battery output characteristics.

However, on the other hand, an increase in the amount of the acidic group-containing monomer used in preparation of the particulate polymer leads to an increase in the amount of moisture imported into a secondary battery due to the particulate polymer and a decrease in secondary battery life characteristics. Therefore, from a viewpoint of improving stability under high shear of a composition for porous membrane-use, durability of a porous membrane, and output characteristics of a secondary battery, while also suppressing an increase in the amount of moisture imported into the secondary battery, it is preferable to use an acidic group-containing monomer that has at least two acidic groups per molecule.

Furthermore, from a viewpoint of improving stability under high shear of a composition for porous membrane-use, durability of a porous membrane, and output characteristics of a secondary battery, the acidic group-containing monomer is preferably a carboxylic acid group-containing monomer, a sulfonate group-containing monomer, or a phosphate group-containing monomer. Among such carboxylic acid group-containing monomers, ethylenically unsaturated dicarboxylic acids having at least two acidic groups per molecule are more preferable, and itaconic acid and maleic acid are particularly preferable.

In other words, the particulate polymer preferably includes a monomer unit derived from an ethylenically unsaturated dicarboxylic acid, and more preferably includes a monomer unit derived from itaconic acid and/or a monomer unit derived from maleic acid.

The percentage content of the acidic group-containing monomer unit in the particulate polymer is preferably at least 0.1 mass %, more preferably at least 0.2 mass %, and particularly preferably at least 0.3 mass %, and is preferably no greater than 5 mass %, more preferably no greater than 3 mass %, particularly preferably less than 2 mass %, and most preferably no greater than 1 mass %. As a result of the percentage content of the acidic group-containing monomer unit being at least 0.1 mass %, stability under high shear of a composition for porous membrane-use, durability of a porous membrane, and output characteristics of a secondary battery are improved. On the other hand, as a result of the percentage content of the acidic group-containing monomer unit being no greater than 5 mass %, elution of the particulate polymer into a non-aqueous electrolysis solution is suppressed and porous membrane durability is improved, and also secondary battery electrical characteristics (particularly life characteristics) are improved due to the amount of moisture imported into the secondary battery due to the particulate polymer being reduced.

Note that a composition for porous membrane-use containing the binder for porous membrane-use that includes the particulate polymer described above has improved dispersibility and displays good stability under high shear as a result of the aromatic monovinyl monomer unit being included in a relatively high percentage in the polymer. Therefore, the composition for porous membrane-use can display sufficient stability under high shear even in a situation in which the percentage content of the acidic group-containing monomer unit in the particulate polymer is reduced in order to achieve improvement in porous membrane durability and reduction in the amount of moisture imported into a secondary battery.

[[Cross-Linkable Monomer Unit]]

A monomer that can form a cross-linked structure during polymerization may be used as a cross-linkable monomer that can form the cross-linkable monomer unit. Specific examples include a monofunctional monomer having a thermally cross-linkable group and one ethylenic double bond per molecule, and a multifunctional monomer having two or more ethylenic double bonds per molecule. Examples of the thermally cross-linkable group included in the monofunctional monomer include an epoxy group, an N-methylol amide group, an oxetanyl group, an oxazoline group, and combinations thereof. As a result of the cross-linkable monomer unit being included in the particulate polymer, the degree of swelling of the particulate polymer with respect to a non-aqueous electrolysis solution can be set at an appropriate level while also improving porous membrane durability.

The cross-linkable monomer may be hydrophobic or hydrophilic.

When a cross-linkable monomer is referred to as "hydrophobic" in the present disclosure, this means that the cross-linkable monomer does not have a hydrophilic group, and when a cross-linkable monomer is referred to as "hydrophilic" in the present disclosure, this means that the cross-linkable monomer has a hydrophilic group. Herein, the term "hydrophilic group" used with respect to the cross-linkable monomer refers to a carboxylic acid group, a hydroxy group, a sulfonate group, a phosphate group, an epoxy group, a thiol group, an aldehyde group, an amide group, an oxetanyl group, or an oxazoline group.

Examples of hydrophobic cross-linkable monomers (hydrophobic cross-linking agents) that can be used include multifunctional (meth)acrylates such as allyl (meth)acrylate, ethylene di(meth)acrylate, diethylene glycol di(meth)acrylate, triethylene glycol di(meth)acrylate, tetraethylene glycol di(meth)acrylate, and trimethylolpropane tri(meth)acrylate; multifunctional allyl/vinyl ethers such as dipropylene glycol diallyl ether, polyglycol diallyl ether, triethylene glycol divinyl ether, hydroquinone diallyl ether, and tetraallyloxyethane; and divinyl benzene.

Examples of hydrophilic cross-linkable monomers (hydrophilic cross-linking agents) that can be used include vinyl glycidyl ether, allyl glycidyl ether, methylolacrylamide, and acrylamide.

The term "(meth)acrylate" used in the present disclosure refers to acrylate and/or methacrylate.

Any one of such cross-linkable monomers may be used individually or any two or more of such cross-linkable monomers may be used in combination.

Among such cross-linkable monomers, hydrophobic cross-linkable monomers are preferable and ethylene dimethacrylate and divinyl benzene are more preferable from a viewpoint of reducing the amount of moisture imported into a secondary battery and improving secondary battery electrical characteristics (particularly life characteristics). Furthermore, ethylene dimethacrylate is particularly preferable from a viewpoint of improving stability under high shear of a composition for porous membrane-use that contains the porous membrane binder.

The percentage content of the cross-linkable monomer unit in the particulate polymer is preferably at least 0.01 mass %, more preferably at least 0.1 mass %, and particularly preferably at least 0.5 mass %, and is preferably no greater than 5 mass %, more preferably no greater than 4 mass %, and particularly preferably no greater than 3 mass %. As a result of the percentage content of the cross-linkable monomer unit being at least 0.01 mass %, elution of the particulate polymer into an electrolysis solution is suppressed and porous membrane durability is improved. Furthermore, the particulate polymer tends not to deform even under high shear, making it possible to improve stability under high shear of a composition for porous membrane-use. On the other hand, as a result of the percentage content of the cross-linkable monomer unit being no greater than 5 mass %, sufficient adhesiveness of the particulate polymer can be ensured and porous membrane durability can be improved.

[Production of Particulate Polymer]

The particulate polymer is produced through polymerization of a monomer composition containing the monomers described above. The presently disclosed particulate polymer, which is a random copolymer, can be obtained while suppressing formation of a block copolymer and a graft copolymer by initiating polymerization with the monomers of the monomer composition still in a monomer state, and not in a partially polymerized oligomer state.

The percentage content of each monomer in the monomer composition is usually the same as the percentage content of the corresponding monomer unit in the desired particulate polymer.

No specific limitations are placed on the mode of polymerization of the particulate polymer so long as the particulate polymer is formed as a random copolymer. Examples of methods that can be used include solution polymerization, suspension polymerization, bulk polymerization, and emulsion polymerization. The polymerization reaction can for example be addition polymerization such as ion polymerization, radical polymerization, or living radical polymerization. The polymerization can be performed using a commonly used emulsifier, dispersant, polymerization initiator, polymerization aid, or the like in a commonly used amount.

[Properties of Particulate Polymer]

The presently disclosed particulate polymer is required to be a random copolymer having a degree of swelling with respect to a non-aqueous electrolysis solution of greater than a factor of 1 and no greater than a factor of 2. It should be noted that the scope of the presently disclosed particulate polymer is inclusive of particulate polymers that have a core structure and a shell structure so long as the shell structure is a random copolymer. The following provides a detailed explanation of properties of the particulate polymer, including the properties described above.

[[Random Copolymer Structure and Glass-Transition Temperature]]

As a result of the particulate polymer being a random copolymer, the polymer can be homogenized, durability of the polymer with respect to an electrolysis solution can be improved, and dispersibility of the polymer in a composition for porous membrane-use can be improved. Moreover, viscosity of a composition for porous membrane-use can be suppressed such that moisture can be easily removed from a porous membrane during drying.

In the present disclosure, it is possible to determine whether or not a particulate polymer is a random copolymer by measuring the glass-transition temperature.

Specifically, when a particulate polymer that is a copolymer has one glass-transition temperature, this indicates that the particulate polymer is a random copolymer. On the other hand, when a particulate polymer has two or more glass-transition temperatures, this indicates that the particulate polymer does not have a random copolymer structure, and is a block copolymer, a graft copolymer, or the like.

In the present disclosure, the "glass-transition temperature" of a particulate polymer can be measured by the measurement method described in the Examples section of the present specification.

The glass-transition temperature of the presently disclosed particulate polymer, which is a random copolymer, is preferably no higher than 10° C., more preferably no higher than 5° C., and particularly preferably no higher than 0° C. Although no specific restrictions are placed on the lower limit for the glass-transition temperature of the particulate polymer, the glass-transition temperature is normally no lower than −100° C.

[[Degree of Swelling with Respect to Non-Aqueous Electrolysis Solution]]

In the present disclosure, the "degree of swelling with respect to a non-aqueous electrolysis solution" of the particulate polymer can be calculated as a value (factor) obtained by dividing the mass of a film formed from the particulate polymer (binder film) after the binder film has been immersed in a specific non-aqueous electrolysis solution under specific conditions by the mass of the binder film prior to being immersed. Specifically, the binder film is formed by a method described in the Examples section of the present specification and is measured by a measurement method described in the same Examples section.

The degree of swelling of the particulate polymer with respect to a non-aqueous electrolysis solution is required to be at least a factor of 1 and no greater than a factor of 2, and is preferably no greater than a factor of 1.9, more preferably no greater than a factor of 1.8, and further preferably no greater than a factor of 1.6. If the degree of swelling of the particulate polymer with respect to a non-aqueous electrolysis solution is greater than a factor of 2, elution of the particulate polymer into the electrolysis solution occurs, leading to a loss of porous membrane durability.

The degree of swelling of the particulate polymer with respect to a non-aqueous electrolysis solution can be adjusted by changing the types and amounts of monomers that are used. For example, the degree of swelling of the particulate polymer with respect to a non-aqueous electrolysis solution can be reduced by increasing the amount of the aromatic monovinyl monomer or the cross-linkable monomer, or by raising the polymerization temperature or lengthening the polymerization reaction time such as to increase the polymerized molecular mass.

[[Contact Angle with Water]]

In the present disclosure, the "contact angle with water" of the particulate polymer refers to the contact angle of a water drop on a film formed from the particulate polymer (binder film). Specifically, the binder film is formed using the method described in the Examples section of the present specification and is measured by a measurement method described in the same Examples section.

The contact angle with water of the particulate polymer is preferably greater than 80°, more preferably at least 85°, and particularly preferably at least 90°, and is preferably no greater than 120°, more preferably no greater than 115°, and particularly preferably no greater than 110°.

[[Particle Diameter]]

The volume average particle diameter D50 of the particulate polymer is preferably at least 0.05 μm and more preferably at least 0.2 μm, and is preferably no greater than 0.6 μm and more preferably no greater than 0.5 μm. As a result of the volume average particle diameter D50 of the particulate polymer being in the range described above, a porous membrane having good durability can be obtained. The "volume average particle diameter D50" of the particulate polymer represents a particle diameter that in a particle distribution (volume basis) measured by laser diffraction, is a particle diameter at which the cumulative volume calculated from a low-particle diameter end of the distribution reaches 50%.

<Production of Binder for Non-Aqueous Secondary Battery Porous Membrane-Use>

No specific limitations are placed on the method by which the binder for porous membrane-use is produced. For example, in a situation in which production of the particulate polymer is carried out in an aqueous medium and the particulate polymer is obtained as a water dispersion, the water dispersion of the particulate polymer may be used as prepared as the binder for porous membrane-use or the water dispersion of the particulate polymer may be used as the binder for porous membrane-use after other optional components have been added thereto. Herein, these other components are for example the other components described in the following section: "Composition for non-aqueous secondary battery porous membrane-use".

(Composition for Non-Aqueous Secondary Battery Porous Membrane-Use)

A presently disclosed composition for non-aqueous secondary battery porous membrane-use is an aqueous slurry composition in which a particulate polymer originating from the binder for porous membrane-use described above and non-conductive particles are dispersed in water used as a dispersion medium.

A porous membrane formed using the presently disclosed composition for porous membrane-use has excellent durability.

<Non-Conductive Particles>

The non-conductive particles are particles that have a property of non-conductivity and that maintain their shape without dissolving in water used as the dispersion medium in the composition for porous membrane-use and in a non-aqueous electrolysis solution of a secondary battery. The non-conductive particles are electrochemically stable and are, therefore, present stably in a porous membrane under the usage environment of a secondary battery. As a result of the composition for porous membrane-use containing the non-conductive particles, a reticulated structure of a porous membrane obtained therewith can be appropriately blocked such that lithium dendrites and the like are prevented from passing through the porous membrane. Consequently, it is possible to more reliably prevent short-circuiting between electrodes. Various types of inorganic particles and organic particles can for example be used as the non-conductive particles.

Examples of inorganic particles that can be used include particles of an oxide such as aluminum oxide (alumina), silicon oxide, magnesium oxide, titanium oxide, $BaTiO_2$, ZrO, or alumina-silica composite oxide; particles of a nitride such as aluminum nitride or boron nitride; covalent crystal particles such as silicon or diamond particles; low-solubility ionic crystal particles such as barium sulfate, calcium fluoride, or barium fluoride particles; and fine particles of a clay material such as talc or montmorillonite.

Examples of organic particles that can be used include particles of various cross-linked polymers such as polyethylene, polystyrene, polydivinyl benzene, cross-linked styrene-divinyl benzene copolymer, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide. Herein, the organic particles and the previously described particulate polymer differ in terms that the particulate polymer has binding ability whereas the organic particles do not have binding ability.

From among such examples, the non-conductive particles are preferably inorganic particles and are more preferably aluminum oxide from a viewpoint of improving durability of a porous membrane and electrical characteristics of a secondary battery including the porous membrane.

The particle diameter of the non-conductive particles is not specifically limited and can be the same as that of conventionally used non-conductive particles.

<Blending Ratio of Non-Conductive Particles and Binder for Porous Membrane-Use>

No specific limitations are placed on the blending ratio of the non-conductive particles and the binder for porous membrane-use in the composition for porous membrane-use. For example, the composition for porous membrane-use contains the binder for porous membrane-use in an amount such that the blended amount of the particulate polymer per 100 parts by mass of the non-conductive particles is preferably at least 0.1 parts by mass, more preferably at least 1 part by mass, and particularly preferably at least 3 parts by mass, and is preferably no greater than 25 parts by mass, more preferably no greater than 20 parts by mass, further preferably no greater than 18 parts by mass, and particularly preferably no greater than 15 parts by mass. A blended amount of the particulate polymer of at least 0.1 parts by mass per 100 parts by mass of the non-conductive particles can ensure close adherence of a porous membrane and a battery component and can improve porous membrane durability, whereas a blended amount of no greater than 25 parts by mass can reduce the amount of moisture imported into a secondary battery due to the particulate polymer and can improve secondary battery electrical characteristics. Furthermore, stability under high shear of the composition for porous membrane-use can be improved.

<Other Components>

Besides the components described above, the slurry composition for porous membrane-use may contain other optional components. No specific limitations are placed on the other optional components so long as they do not have an excessively negative influence on the battery reaction in a secondary battery in which the porous membrane is used. Furthermore, one type of optional component may be used or two or more types of optional components may be used.

Examples of optional components that can be used include wetting agents, leveling agents, electrolysis solution decomposition inhibitors, and water-soluble polymers.

[Water-Soluble Polymers]

Among the other components mentioned above, the composition for porous membrane-use preferably contains a water-soluble polymer. As a result of the composition for porous membrane-use, which is an aqueous slurry composition, containing the water-soluble polymer, the composition for porous membrane-use can be thickened in order to adjust the viscosity to an appropriate level for easy application. Additionally, the water-soluble polymer has binding ability and electrolysis solution-resistance, and can therefore perform a function of assisting binding of components by the particulate polymer in a porous membrane and close adhesion of the porous membrane and a battery component in a secondary battery. Therefore, porous membrane durability can be further improved through use of the water-soluble polymer.

When a substance is described as "water-soluble" in the present disclosure, this means that when 0.5 g of the substance is dissolved in 100 g of water at 25° C., insoluble matter is less than 1.0 mass %. Note that in the case of a substance for which the solubility thereof varies depending on the pH of water, the substance is considered to be "water-soluble" so long as the above definition of "water-soluble" is applicable thereto at at least one pH level.

Examples of water-soluble polymers that can be used include natural polymers, semi-synthetic polymers, and synthetic polymers.

[Natural Polymers]

Examples of natural polymers that can be used include polysaccharides and proteins derived from plants or animals, fermentation treated products of these polysaccharides and proteins by microorganisms or the like, and heat treated products of these polysaccharides and proteins.

These natural polymers can be classified as plant-based natural polymers, animal-based natural polymers, and microorganism-produced natural polymers.

Examples of plant-based natural polymers that can be used include gum arabic, gum tragacanth, galactan, guar gum, carob gum, karaya gum, carrageenan, pectin, kannan, quince seed (marmelo), algal colloid (phaeophyceae extract), starch (derived from rice, corn, potato, wheat, or the like), and glycyrrhizin. Examples of animal-based natural polymers that can be used include collagen, casein, albumin, and gelatin. Examples of microorganism-produced natural polymers that can be used include xanthan gum, dextran, succinoglucan, and pullulan.

[Semi-Synthetic Polymers]

Examples of semi-synthetic polymers that can be used include cellulosic semi-synthetic polymers. Cellulosic semi-synthetic polymers can be categorized as non-ionic cellulosic semi-synthetic polymers, anionic cellulosic semi-synthetic polymers, and cationic cellulosic semi-synthetic polymers.

Examples of non-ionic cellulosic semi-synthetic polymers that can be used include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methylcellulose, hydroxypropyl cellulose, hydroxypropyl methylcellulose, hydroxyethyl methylcellulose, hydroxypropyl methylcellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymers that can be used include substitution products obtained by substitution of the non-ionic cellulosic semi-synthetic polymers described above with various derivative groups and salts (sodium salts, ammonium salts, and the like) of these substitution products. Specific examples include sodium cellulose sulfate, methyl cellulose, methyl ethyl cellulose, ethyl cellulose, carboxymethyl cellulose (CMC), and salts thereof.

Examples of cationic cellulosic semi-synthetic polymers that can be used include low nitrogen hydroxyethyl cellulose dimethyldiallyl ammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

[Synthetic Polymers]

Examples of synthetic polymers that can be used include salts of polyacrylic acid such as sodium polyacrylate, polyvinyl alcohol, polyethylene oxide, polyvinyl pyrrolidone, copolymers of vinyl alcohol and acrylic acid or a salt of acrylic acid, fully or partially saponified copolymers of vinyl acetate and maleic anhydride, maleic acid, or fumaric acid, modified polyvinyl alcohol, modified polyacrylic acid, polyethylene glycol, polycarboxylic acid, ethylene-vinyl alcohol copolymers, vinyl acetate polymers, and acrylamide polymers having an introduced carboxylic acid group.

Among such water-soluble polymers, carboxymethyl cellulose, a salt thereof, or an acrylamide polymer having an introduced carboxylic acid group is preferable from a viewpoint of providing a porous membrane with heat resistance and suppressing thermal contraction of an organic separator made from polypropylene or the like. Furthermore, an acrylamide polymer having an introduced carboxylic acid group is particularly preferable from a viewpoint of reducing the amount of moisture imported into a secondary battery and improving electrical characteristics.

The blended amount of the water-soluble polymer in the composition for porous membrane-use per 100 parts by mass of the non-conductive particles is preferably at least 0.1 parts by mass and more preferably at least 0.5 parts by mass, and is preferably no greater than 10 parts by mass and more preferably no greater than 5 parts by mass. As a result of the blended amount of the water-soluble polymer being in the range described above, the composition for porous membrane-use can be provided with an appropriate level of viscosity, and durability of a porous membrane obtained therewith can be improved.

<Production of Composition for Non-Aqueous Secondary Battery Porous Membrane-Use>

Although no specific limitations are placed on the method by which the composition for porous membrane-use is produced, the composition is normally obtained by mixing the previously described binder for porous membrane-use, non-conductive particles, water, and other optional components as required. Although no specific limitations are placed on the mixing method, the mixing is performed using a disperser as a mixing apparatus in order to efficiently disperse the components.

The disperser is preferably an apparatus that can disperse and mix the components uniformly. Examples of dispersers that can be used include a ball mill, a sand mill, a pigment disperser, a grinding machine, an ultrasonic disperser, a homogenizer, and a planetary mixer. Among such dispersers, a highly dispersing apparatus such as a bead mill, a roll mill, or a FILMIX is particularly preferably because high dispersion shear can be applied.

The solid content concentration of the composition for porous membrane-use can normally be freely set within a range such that the viscosity of the slurry composition is in a range that does not cause a loss of workability during production of a porous membrane. Specifically, the solid content concentration of the composition for porous membrane-use can normally be from 10 mass % to 50 mass %.

(Porous Membrane for Non-aqueous Secondary Battery-Use)

A porous membrane for non-aqueous secondary battery-use can for example be formed on a substrate by applying the composition for secondary battery porous membrane-use described above onto the surface of a suitable substrate to form an applied membrane, and drying the applied membrane. The porous membrane has excellent durability and a non-aqueous secondary battery including the porous membrane has excellent durability.

The substrate onto which the composition for porous membrane-use is applied is a member that is a target for formation of an applied membrane of the composition for porous membrane-use. There are no limitations on the substrate. For example, an applied membrane of the composition for porous membrane-use may be formed on the surface of a detachable substrate, the applied membrane may be dried to form a porous membrane, and the detachable substrate may be peeled from the porous membrane. The porous membrane peeled from the detachable substrate as described above can be used in a secondary battery as a free-standing membrane.

However, from a viewpoint of omitting a step of peeling the porous membrane and improving production efficiency, it is preferable that a battery component is used as the substrate. Specific examples of battery components that can be used as the substrate include a separator and an electrode. A porous membrane provided on a separator or an electrode can be suitably used as a protective layer for improving heat resistance, strength, and so forth of the separator or electrode.

<Separator>

Although no specific limitations are placed on the separator, the separator may for example be a known separator such as an organic separator. Herein, the organic separator is a porous member made from an organic material and may for example be a fine porous membrane or non-woven fabric including a polyolefin resin such as polyethylene or polypropylene, an aromatic polyamide resin, or the like. A fine porous membrane or non-woven fabric made from polyethylene is preferable due to having excellent strength. Although the thickness of the organic separator can be freely set, the thickness is normally at least 0.5 µm and preferably at least 5 µm, and is normally no greater than 40 µm, preferably no greater than 30 µm, and more preferably no greater than 20 µm.

<Electrode>

Although no specific limitations are placed on the electrode (positive electrode, negative electrode), the electrode is for example obtained by forming an electrode mixed material layer on a current collector.

The current collector, an electrode active material (positive electrode active material, negative electrode active material) and a binder for electrode mixed material layer-use (binder for positive-electrode mixed material layer-use, binder for negative-electrode mixed material layer-use) in the electrode mixed material layer, and the method by which the electrode mixed material layer is formed on the current collector can be known examples thereof such as described, for example, in JP 2013-145763 A.

<Formation Method of Porous Membrane for Non-Aqueous Secondary Battery-Use>

Methods that can be used for forming the porous membrane on a battery component such as the separator or the electrode described above include:

(1) a method involving applying the composition for porous membrane-use onto the surface of the battery component (surface at an electrode mixed material layer-side in the case of the electrode; same applicable below) and subsequently drying the applied composition;

(2) a method involving immersing the battery component in the composition for porous membrane-use and subsequently drying the applied composition; and (3) a method involving applying the composition for porous membrane-use onto a detachable substrate, drying the applied composition to produce a porous membrane, and transferring the produced porous membrane onto the surface of the battery component.

Among these methods, method (1) is particularly preferable in terms that thickness of the porous membrane can be easily controlled. More specifically, method (1) includes a step of applying the composition for porous membrane-use onto the battery component (application step) and a step of drying the composition for porous membrane-use applied onto the battery component to form a porous membrane (porous membrane formation step).

No specific limitations are placed on the method by which the composition for porous membrane-use is applied onto the battery component in the application step. The application method may for example be doctor blading, reverse roll coating, direct roll coating, gravure coating, extrusion coating, or brush coating. Among these methods, gravure coating is preferable in terms that a uniform porous membrane can be obtained.

The method by which the composition for porous membrane-use is dried on the battery component in the porous membrane formation step is not specifically limited and can be a commonly known method. The drying method may for example be drying by warm, hot, or low-humidity air; drying in a vacuum; or drying by irradiation with infrared light or electron beams. Although no specific limitations are placed on the drying conditions, the drying temperature is preferably from 50° C. to 150° C., and the drying time is preferably from 5 minutes to 30 minutes.

So long as the effects of the present disclosure are not significantly lost, the positive electrode, the negative electrode, and the separator may include other elements of configuration besides the battery component itself and the presently disclosed porous membrane. For example, another layer may be provided between the battery component and the presently disclosed porous membrane as required. In such a situation, the presently disclosed porous membrane is provided indirectly on the surface of the battery component. Furthermore, a different layer may be further provided on the surface of the presently disclosed porous membrane.

The thickness of the porous membrane formed on the substrate is preferably at least 0.01 μm, more preferably at least 0.1 μm, and particularly preferably at least 1 μm, and is preferably no greater than 20 μm, more preferably no greater than 10 μm, and particularly preferably no greater than 5 μm. Sufficient porous membrane strength can be ensured through the thickness of the porous membrane being at least 0.01 μm, and diffusivity of an electrolysis solution can be ensured and output characteristics of a secondary battery including the porous membrane can be improved through the thickness of the porous membrane being no greater than 20 μm.

(Non-Aqueous Secondary Battery)

A presently disclosed non-aqueous secondary battery includes a positive electrode, a negative electrode, a separator, and an electrolysis solution, wherein the porous membrane for non-aqueous secondary battery-use described above is provided on the surface of at least one battery component selected from the group consisting of the positive electrode, the negative electrode, and the separator.

The presently disclosed non-aqueous secondary battery has excellent durability and high performance as a result of including a porous membrane obtained using the presently disclosed composition for porous membrane-use.

<Positive Electrode, Negative Electrode, Separator, and Porous Membrane>

The positive electrode, the negative electrode, the separator, and the porous membrane can be the same as the examples provided in the previous section: "Porous membrane for non-aqueous secondary battery-use". The method by which a porous membrane is provided on the surface of the positive electrode, the negative electrode, and/or the separator can also be any of the methods described in the same section.

<Electrolysis Solution>

An organic electrolysis solution obtained by dissolving a supporting electrolyte in an organic solvent is normally used as the electrolysis solution. The supporting electrolyte is for example a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Among such lithium salts, $LiPF_6$, $LiClO_4$, and $CF_3SO_3Li$ are preferable in terms that these lithium salts dissolve readily in a solvent and display a high degree of dissociation. Note that one electrolyte may be used individually or two or more electrolytes may be used in combination. Use of a supporting electrolyte having a high degree of dissociation usually tends to lead to an increase in lithium ion conductivity. Accordingly, lithium ion conductivity can be adjusted through the type of supporting electrolyte that is used.

No specific limitations are placed on the organic solvent used in the electrolysis solution other than being an organic solvent in which the supporting electrolyte can dissolve. Examples of appropriate organic solvents that can be used in lithium ion secondary batteries include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Alternatively, a mixed solution of any of these solvents may be used. Among such organic solvents, carbonates are preferable due to having a high permittivity and a wide stable potential region. Use of a lower viscosity solvent usually tends to lead to higher lithium ion conductivity. Accordingly, lithium ion conductivity can be adjusted through the type of solvent that is used.

The concentration of the electrolyte in the electrolysis solution can be adjusted as appropriate. Moreover, a known additive may be added to the electrolysis solution.

<Method of Producing Non-Aqueous Secondary Battery>

The non-aqueous secondary battery can for example be produced by overlapping the positive electrode and the negative electrode via the separator, performing rolling, folding, or the like of the resultant product as required to place the resultant product in a battery container, pouring the electrolysis solution into the battery container, and sealing the battery container. At least one of the positive electrode, the negative electrode, and the separator is a porous membrane-equipped member. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may for example be a coin type, a button type, a sheet type, a cylinder type, a prismatic type, or a flat type.

EXAMPLES

The following describes the present disclosure through examples. However, the present disclosure is not limited to these examples. Values given in units of "parts" or "%" in these examples are mass basis values unless specified otherwise.

The glass-transition temperature and the volume average particle diameter D50 of a particulate polymer were measured by the following methods in the examples and comparative examples. Furthermore, methods described below were used to evaluate the degree of swelling of a particulate polymer with respect to a non-aqueous electrolysis solution, the contact angle of a particulate polymer with water, the durability and moisture content of a porous membrane, the stability under high shear of a composition for porous membrane-use, and the life characteristics and output characteristics of a non-aqueous secondary battery.

<Glass-Transition Temperature>

A water dispersion containing a particulate polymer was dried for three days in an environment of 50% humidity and 23° C. to 25° C. to obtain a film having a thickness of 1±0.3 mm. This film was dried for 1 hour in a hot air oven at 120° C. Thereafter, the dried film was used as a sample for measuring the glass-transition temperature (° C.) in accordance with JIS K7121 using a differential scanning calorimeter (DSC6220 produced by SII Nanotechnology Inc.) with a measurement temperature of from −100° C. to 180° C. and a heating rate of 5° C./minute.

<Volume Average Particle Diameter D50>

The volume average particle diameter D50 of a particulate polymer was measured using a laser diffraction/light scattering particle size analyzer (LS230 produced by Beckman Coulter Inc.).

<Degree of Swelling of Particulate Polymer with Respect to Non-Aqueous Electrolysis Solution>

A 1 cm×1 cm binder film (thickness 500 μm) was produced by applying a binder for non-aqueous secondary battery porous membrane-use (water dispersion of a particulate polymer) onto an electrolytic copper foil (NC-WS® (NC-WS is a registered trademark in Japan, other countries, or both) produced by Furukawa Electric Co., Ltd.) using a table coater and performing drying at 50° C. for 20 minutes and at 120° C. for 20 minutes using a hot-air dryer. The mass M0 of this binder film was measured. Thereafter, the resultant film was immersed in a non-aqueous electrolysis solution (solvent: EC/DEC/VC=68.5/30/1.5 (volume ratio), electrolyte: 1M concentration $LiPF_6$) for 72 hours at 60° C. After immersion, non-aqueous electrolysis solution was wiped from the surface of the film and the mass M1 of the film was measured. The degree of swelling with respect to the non-aqueous electrolysis solution was calculated according to the following equation.

$$\text{Degree of swelling with respect to non-aqueous electrolysis solution} = M1/M0$$

<Contact Angle of Particulate Polymer with Water (Water Drop Contact Angle of Binder Film)>

Three 1 cm×1 cm binder films (thickness 500 μm) were produced by the same method as in the previous section: "Degree of swelling of particulate polymer with respect to non-aqueous electrolysis solution". A drop of distilled water was dripped onto one of the films and the contact angle of the formed water drop was measured by a contact angle meter (Model CA-DT-A produced by Kyowa Interface Science Co., Ltd.) under conditions of an ambient temperature of 23° C. and 50% RH. The contact angle was measured in the same manner at two points on each of the three binder films and was expressed as an average value of the six measured values. It should be noted that the water drop of distilled water had a diameter of 2 mm and the number for the contact angle that appeared on the meter was a value measured one minute after the water drop of distilled water had been dripped onto the film.

<Durability of Porous Membrane>

A porous membrane-equipped separator was cut out to a size of 5 cm×5 cm, the mass thereof was measured, and the mass M0 of the porous membrane was calculated by subtracting the mass of the separator. Next, the porous membrane-equipped separator that had been cut out was immersed in a non-aqueous electrolysis solution (solvent: EC/DEC/VC=68.5/30/1.5 (volume ratio), electrolyte: 1M concentration $LiPF_6$) at 60° C. and was subjected to ultrasonic vibration for 10 minutes at 30 kHz. The porous membrane-equipped separator was subsequently removed from the non-aqueous electrolysis solution and was dried for 10 hours at an ambient temperature of 60° C. The mass M1 of the porous membrane after drying was calculated in the same way as the mass M0. The rate of vibration drop-off ΔM (%) was calculated using an equation ΔM={(M0−M1)/M0}×100, and was evaluated as shown below. A smaller value indicates better durability.

A: Rate of vibration drop-off ΔM of less than 20%
B: Rate of vibration drop-off ΔM of at least 20% and less than 40%
C: Rate of vibration drop-off ΔM of at least 40% and less than 60%
D: Rate of vibration drop-off ΔM of at least 60%

<Moisture Content of Porous Membrane>

A porous membrane-equipped separator was cut out to a size of 10 cm×10 cm and was used as a test piece. The test piece was left for 24 hours at a temperature of 25° C. and a humidity of 50%. Thereafter, the moisture content W (ppm) of the test piece was measured by the Karl-Fischer method (moisture vaporization method of JIS K-0068 (2001), vaporization temperature 150° C.) using a coulometric titration moisture meter. A smaller value indicates that the porous membrane has a lower moisture content and that a smaller amount of moisture is imported into a secondary battery.

A: Moisture content W of no greater than 500 ppm
B: Moisture content W of greater than 500 ppm and no greater than 600 ppm
C: Moisture content W of greater than 600 ppm and no greater than 700 ppm
D: Moisture content W of greater than 700 ppm <Stability Under High Shear of Composition for Porous Membrane-Use>

A composition for porous membrane-use was applied onto a separator (made from polyethylene) using a gravure roller (number of lines 95) under conditions of a conveyance speed of 50 m/minute and a gravure rotation ratio of 100%. After the application, the separator was cut out and the applied amount M0 (mg/cm$^2$) per unit area was calculated. Once one hour had elapsed since the start of application, the applied amount M1 (mg/cm$^2$) was calculated in the same way. The rate of change in applied amount ΔM (%) was calculated using an equation ΔM=(|M0−M1|)/M0×100 (%), and was evaluated as shown below. A smaller value indicates that the composition for porous membrane-use has higher stability.

A: Rate of change of applied amount ΔM of less than 5%
B: Rate of change of applied amount ΔM of at least 5% and less than 10%
C: Rate of change of applied amount ΔM of at least 10% and less than 20%
D: Rate of change of applied amount ΔM of at least 20%

<Life Characteristics>

A produced secondary battery was left for 24 hours at an ambient temperature of 25° C. Thereafter, charging and discharging operations were performed at an ambient temperature of 25° C. by charging the secondary battery to 4.35 V at 0.1 C and discharging the secondary battery to 2.75 V at 0.1 C. The secondary battery was subsequently charged to 4.35 V at 0.1 C and was then left for 168 hours (7 days) at 60° C. in this charged state. After this period, the cell voltage V1 (V) was measured at 25° C. The voltage drop ΔV (mV) was calculated using an equation ΔV={4.35−V1}×1000, and was evaluated as shown below. A smaller value indicates better life characteristics (self-discharge characteristics).

A: Voltage drop ΔV of no greater than 200 mV
B: Voltage drop ΔV of greater than 200 mV and no greater than 400 mV
C: Voltage drop ΔV of greater than 400 mV and no greater than 600 mV
D: Voltage drop ΔV of greater than 600 mV <Output Characteristics>

A produced secondary battery was left for 24 hours at an ambient temperature of 25° C. Thereafter, a charging operation was performed for 5 hours to 4.2 V at 0.1 C with an ambient temperature of 25° C., and the voltage V0 (V) was measured at this time. Next, a discharge operation was performed at a discharge rate of 1 C and an ambient temperature of −10° C. and the voltage V2 (V) was measured 15 seconds after the start of discharge. The voltage change ΔV (mV) was calculated using an equation ΔV={V0−V2}×1000, and was evaluated as shown below. A smaller value indicates better output characteristics (low-temperature characteristics).

A: Voltage change ΔV of no greater than 500 mV
B: Voltage change ΔV of greater than 500 mV and no greater than 700 mV
C: Voltage change ΔV of greater than 700 mV and no greater than 900 mV
D: Voltage change ΔV of greater than 900 mV Example 1

<Production of Binder for Non-Aqueous Secondary Battery Porous Membrane-Use>

A reaction vessel equipped with a stirrer was charged with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate. The gas phase in the reaction vessel was purged with nitrogen gas and the reaction vessel was heated to 60° C.

In a separate vessel, a monomer composition was prepared by mixing 50 parts of deionized water, 0.5 parts of sodium dodecylbenzenesulfonate as a dispersant, 58.2 parts of 2-ethylhexyl acrylate (2-EHA) as an alkyl (meth)acrylate monomer, 40 parts of styrene (ST) as an aromatic monovinyl monomer, 0.8 parts of itaconic acid (IA) as an acidic group-containing monomer, and 1.0 parts of ethylene dimethacrylate (EDMA) as a cross-linkable monomer. The monomer composition was added continuously to the reaction vessel over a period of 4 hours and was caused to polymerize. A reaction was carried out at 60° C. during the addition. After the addition was complete, stirring was performed for a further 3 hours at 70° C. to complete the reaction and produce a particulate polymer-containing water dispersion (binder for porous membrane-use).

The obtained particulate polymer had a volume average particle diameter D50 of 0.36 μm. Furthermore, only one glass-transition temperature (−8° C.) was observed, confirming that the particulate polymer was a random copolymer. The degree of swelling of the particulate polymer with respect to a non-aqueous electrolysis solution and the contact angle of the particulate polymer with water were also measured. The results are shown in Table 1.

<Production of Composition for Non-Aqueous Secondary Battery Porous Membrane-Use>

A composition for porous membrane-use was produced by mixing 8 parts in solid equivalents of the particulate polymer-containing binder for porous membrane-use, 1.5 parts of an acrylamide polymer having an introduced carboxylic acid group (Polystron® 117 (Polystron is a registered trademark in Japan, other countries, or both) produced by Arakawa Chemical Industries, Ltd.) as a thickener, and 0.2 parts of a polyethylene glycol surfactant (San Nopco® SN-Wet 366 (San Nopco is a registered trademark in Japan, other countries, or both) produced by San Nopco Limited) relative to 100 parts of an alumina filler (LS256 produced by Nippon Light Metal Co., Ltd.) as non-conductive particles.

The obtained composition for porous membrane-use was used for evaluation of stability under high shear. The results are shown in Table 1.

<Production of Porous Membrane and Porous Membrane-Equipped Separator>

An organic separator (produced by Celgard, LLC., thickness 16 μm) formed by a porous substrate made from polyethylene was prepared. The composition for porous membrane-use obtained as described above was applied onto one surface of the prepared organic separator and was dried for 10 minutes at 60° C. As a result, a separator including a porous membrane of 27 μm in thickness (porous membrane-equipped separator) was obtained.

The obtained porous membrane-equipped separator was used for evaluation of durability and moisture content. The results are shown in Table 1.

<Production of Negative Electrode>

A 5-MPa pressure vessel equipped with a stirrer was charged with 33 parts of 1,3-butadiene, 3.5 parts of IA, 63.5 parts of ST, 0.4 parts of sodium dodecylbenzenesulfonate as an emulsifier, 150 parts of deionized water, and 0.5 parts of potassium persulfate as a polymerization initiator. The pressure vessel was sufficiently stirred and polymerization was initiated by heating to 50° C. When the polymerization conversion rate reached 96%, cooling was performed to stop the reaction and yield a mixture containing a binder for negative-electrode mixed material layer-use (SBR). A 5% sodium hydroxide aqueous solution was added to the mixture containing the binder for negative-electrode mixed material layer-use to adjust the pH to 8. Thereafter, unreacted monomer was removed by heated vacuum distillation and subsequently cooling was performed to 30° C. or lower to yield a water dispersion containing a desired binder for negative-electrode mixed material layer-use.

After mixing 100 parts of artificial graphite (average particle diameter: 15.6 μm) as a negative electrode active material, 1 part in solid equivalents of a 2% carboxymethyl cellulose sodium salt (MAC350HC produced by Nippon Paper Industries Co., Ltd.) aqueous solution as a water-soluble polymer, and deionized water, and adjusting the solid content concentration to 68%, further mixing was performed for 60 minutes at 25° C. Mixing was performed for a further 15 minutes at 25° C. after adjusting the solid content concentration to 62% using deionized water. Next, 1.5 parts in solid equivalents of the binder for negative-electrode mixed material layer-use and deionized water were added to the mixed solution, the final solid content concentration was adjusted to 52%, and mixing was performed for a further 10 minutes. The resultant mixed solution was defoamed under reduced pressure to yield a slurry composition for secondary battery negative electrode-use having good fluidity.

The obtained slurry composition for negative electrode-use was applied onto copper foil of 20 μm in thickness used as a current collector using a comma coater such as to have a film thickness after drying of approximately 150 μm, and was dried. The drying was performed by conveying the copper foil through a 60° C. oven over a period of 2 minutes at a speed of 0.5 m/minute. Thereafter, heat treatment was performed for 2 minutes at 120° C. to obtain a pre-pressing negative electrode web. The pre-pressing negative electrode web was rolled by roll pressing to obtain a post-pressing negative electrode (one-sided negative electrode) having a negative-electrode mixed material layer of 80 μm in thickness.

In addition, application was performed in the same way on a rear surface of the pre-pressing negative electrode web described above to form negative-electrode mixed material layers on both surfaces and rolling was performed by roll pressing to obtain a post-pressing negative electrode (two-sided negative electrode) having negative-electrode mixed material layers of 80 μm each in thickness.

<Production of Positive Electrode>

After mixing 100 parts of $LiCoO_2$ having a volume average particle diameter of 12 μm used as a positive electrode active material, 2 parts of acetylene black (HS-100 produced by Denki Kagaku Kogyo Kabushiki Kaisha) used as a conductive material, 2 parts in solid equivalents of polyvinylidene fluoride (#7208 produced by Kureha Corporation) used as a binder for positive-electrode mixed material layer-use, and N-methylpyrrolidone such that the total solid content concentration was 70%, further mixing was then performed to produce a slurry composition for positive electrode-use.

The resultant slurry composition for positive electrode-use was applied onto aluminum foil of 20 μm in thickness used as a current collector using a comma coater such as to have a film thickness after drying of approximately 150 μm, and was dried. The drying was performed by conveying the aluminum foil through a 60° C. oven over a period of 2 minutes at a speed of 0.5 m/minute. Thereafter, heat treatment was performed for 2 minutes at 120° C. to obtain a pre-pressing positive electrode web. The pre-pressing positive electrode web was rolled by roll pressing to obtain a post-pressing positive electrode (one-sided positive electrode) having a positive-electrode mixed material layer of 80 μm in thickness.

In addition, application was performed in the same way on a rear surface of the pre-pressing positive electrode web described above to form positive-electrode mixed material layers on both surfaces and rolling was performed by roll pressing to obtain a post-pressing positive electrode (two-sided positive electrode) having positive-electrode mixed material layers of 80 μm each in thickness.

<Production of Secondary Battery>

A stack A was prepared by cutting out a one-sided positive electrode obtained as described above to a size of 5 cm×15 cm, arranging thereon (mixed material layer-side) a porous membrane-equipped separator cut out to a size of 6 cm×16 cm such that the porous membrane faced the one-sided positive electrode, and arranging thereon a two-sided negative electrode cut out to a size of 5.5 cm×15.5 cm. A porous membrane-equipped separator cut out to a size of 6 cm×16 cm was arranged at the two-sided negative electrode-side of the stack A such that the organic separator thereof faced the two-sided negative electrode, and a two-sided positive electrode cut out to a size of 5 cm×15 cm was overlapped thereon. Next, a porous membrane-equipped separator cut out to a size of 6 cm×16 cm was further arranged on the two-sided positive electrode such that the porous membrane faced the two-sided positive electrode. Finally, a stack B was obtained by stacking a one-sided negative electrode cut out to a size of 5.5 cm×5.5 cm on the porous membrane-equipped separator such that the negative-electrode mixed material layer faced the organic separator of the porous membrane-equipped separator. The stack B was enclosed in an aluminum packing case used as a battery packing case and a non-aqueous electrolysis solution (solvent: EC/DEC/VC=68.5/30/1.5 (volume ratio), electrolyte: 1M concentration $LiPF_6$) was supplied therein such that no air remained. Furthermore, the aluminum packing case was closed by heat sealing at 150° C. to obtain a battery case that was then flat pressed for 2 minutes at 100° C. and 100 kgf to produce a 1000-mAh stacked lithium ion secondary battery.

The produced secondary battery was used for evaluation of life characteristics and output characteristics. The results are shown in Table 1.

Examples 2-4 and 14

In each of Examples 2-4 and 14, a binder for porous membrane-use, a composition for porous membrane-use, porous membrane-equipped separators, negative electrodes, positive electrodes, and a secondary battery were produced in the same way as in Example 1 with the exception that the amounts of 2-EHA and ST used in production of the binder for porous membrane-use were changed as shown in Table 1. Evaluation was performed for the same categories as in Example 1. The results are shown in Table 1.

Example 5

In Example 5, a binder for porous membrane-use, a composition for porous membrane-use, porous membrane-equipped separators, negative electrodes, positive electrodes, and a secondary battery were produced in the same way as in Example 1 with the exception that sodium styrenesulfonate (NaSS) was used instead of ST in production of the binder for porous membrane-use. Evaluation was performed for the same categories as in Example 1. The results are shown in Table 1.

Example 6

In Example 6, a binder for porous membrane-use, a composition for porous membrane-use, porous membrane-equipped separators, negative electrodes, positive electrodes, and a secondary battery were produced in the same way as in Example 1 with the exception that octyl acrylate (OA) was used instead of 2-EHA in production of the binder for porous membrane-use. Evaluation was performed for the same categories as in Example 1. The results are shown in Table 1.

Examples 7 and 8

In each of Examples 7 and 8, a binder for porous membrane-use, a composition for porous membrane-use, porous membrane-equipped separators, negative electrodes, positive electrodes, and a secondary battery were produced in the same way as in Example 1 with the exception that the amounts of 2-EHA and IA used in production of the binder for porous membrane-use were changed as shown in Table 1. Evaluation was performed for the same categories as in Example 1. The results are shown in Table 1.

Examples 9 and 10

In each of Examples 9 and 10, a binder for porous membrane-use, a composition for porous membrane-use, porous membrane-equipped separators, negative electrodes, positive electrodes, and a secondary battery were produced in the same way as in Example 1 with the exception that methacrylic acid (MAA) or vinyl sulfonic acid (VSA) was used instead of IA in production of the binder for porous membrane-use. Evaluation was performed for the same categories as in Example 1. The results are shown in Table 1.

Example 11

In Example 11, a binder for porous membrane-use, a composition for porous membrane-use, porous membrane-equipped separators, negative electrodes, positive electrodes, and a secondary battery were produced in the same way as in Example 1 with the exception that divinyl benzene (DVB) was used instead of EDMA in production of the binder for porous membrane-use. Evaluation was performed for the same categories as in Example 1. The results are shown in Table 1.

Example 12

In Example 12, a binder for porous membrane-use, a composition for porous membrane-use, porous membrane-equipped separators, negative electrodes, positive electrodes, and a secondary battery were produced in the same way as in Example 1 with the exception that the amounts of 2-EHA and EDMA used in production of the binder for porous membrane-use were changed as shown in Table 1. Evaluation was performed for the same categories as in Example 1. The results are shown in Table 1.

Example 13

In Example 13, a composition for porous membrane-use, porous membrane-equipped separators, negative electrodes, positive electrodes, and a secondary battery were produced in the same way as in Example 1 with the exception that 16 parts in solid equivalents of the water dispersion of the particulate polymer (binder for porous membrane-use) were used in production of the composition for porous membrane-use. Evaluation was performed for the same categories as in Example 1. The results are shown in Table 1.

Comparative Examples 1-3

In each of Comparative Examples 1-3, a binder for porous membrane-use, a composition for porous membrane-use, porous membrane-equipped separators, negative electrodes, positive electrodes, and a secondary battery were produced in the same way as in Example 1 with the exception that, in production of the binder for porous membrane-use, the amounts of 2-EHA and ST that were used were changed as shown in Table 1 (ST was not used in Comparative Example 1), an amount of MAA shown in Table 1 was used instead of 0.8 parts of IA, and 1.5 parts of acrylamide (AAm) were used instead of 1 part of EDMA. Evaluation was performed for the same categories as in Example 1. The results are shown in Table 1.

Comparative Example 4

In Comparative Example 4, a composition for porous membrane-use, porous membrane-equipped separators, negative electrodes, positive electrodes, and a secondary battery were produced in the same way as in Example 1 with the exception that a binder for porous membrane-use produced as described below was used. Evaluation was performed for the same categories as in Example 1. The results are shown in Table 1.

<Production of Binder for Porous Membrane-Use>

A reaction vessel equipped with a stirrer was charged with 230 parts of deionized water, 0.15 parts of sodium lauryl sulfate (EMAL® 2F produced by Kao Corporation) as an emulsifier, 50 parts of n-butyl acrylate (BA), 50 parts of styrene macromonomer (STMM, polystyrene oligomer methacryloylated at one end, AS-6 produced by Toagosei Co., Ltd.), and 1 part of t-butyl peroxy-2-ethylhexanoate and was sufficiently stirred. Thereafter, heating was performed to 90° C. to cause polymerization and obtain a water dispersion of a polymer. When the glass-transition temperature of the obtained particulate polymer was measured, two glass-transition temperatures (−40° C. and 97° C.) were observed, confirming that the particulate polymer was a graft copolymer.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Particulate polymer | Copolymer structure | | Random | Random | Random | Random | Random | Random | Random | Random | Random |
| | Alkyl (meth)acrylate monomer unit | Type | 2-EHA | 2-EHA | 2-EHA | 2-EHA | 2-ERA | OA | 2-EHA | 2-EHA | 2-EHA |
| | | Percentage content (mass %) | 58.2 | 68.2 | 48.2 | 38.2 | 58.2 | 58.2 | 58.8 | 57.1 | 58.2 |
| | Aromatic monovinyl monomer unit | Type | ST | ST | ST | ST | NaSS | ST | ST | ST | ST |
| | | Percentage content (mass %) | 40 | 30 | 50 | 60 | 40 | 40 | 40 | 40 | 40 |
| | Acidic group-containing monomer unit | Type | IA | IA | IA | IA | IA | IA | IA | IA | MAA |
| | | Percentage content (mass %) | 0.8 | 0.8 | 0.8 | 0.8 | 0.8 | 0.8 | 0.2 | 1.9 | 0.8 |
| | Cross-linkable monomer unit | Type | EDMA | EDMA | EDMA | EDMA | EDMA | EDMA | EDMA | EDMA | EDMA |
| | | Percentage content (mass %) | 1 | 1 | 1 | 1 | 1 | 1 | 1 | 1 | 1 |
| | Degree of swelling (factor) with respect to non-aqueous electrolysis solution | | 1.3 | 1.5 | 1.3 | 1.2 | 1.7 | 1.3 | 1.5 | 1.8 | 1.5 |
| | Glass-transition temperature (° C.) | | −8 | −38 | 3 | 12 | −10 | −15 | −9 | −6 | −8 |
| | Contact angle with water (°) | | 104 | 83 | 110 | 118 | 96 | 95 | 108 | 88 | 108 |
| | Blended amount (parts by mass) per 100 parts by mass of non-conductive particles | | 8 | 8 | 8 | 8 | 8 | 8 | 16 | 8 | 8 |

TABLE 1-continued

|  |  |  |  |  |  |  |  |  |  |
|---|---|---|---|---|---|---|---|---|---|
| Durability | A | A | A | B | A | A | A | B | B |
| Moisture content | A | A | A | A | B | A | A | B | B |
| Stability under high shear | A | B | A | A | A | A | B | A | B |
| Life characteristics | A | A | A | A | B | A | A | B | A |
| Output characteristics | A | A | A | A | A | A | A | B | B |

| | | | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|---|
| Particulate polymer | Copolymer structure | | Random | Random | Random | Random | Random | Random | Random | Random | Graft |
| | Alkyl (meth)acrylate monomer unit | Type | 2-EHA | 2-EHA | 2-EHA | 2-EHA | 2-EHA | 2-EHA | 2-EHA | 2-EHA | BA |
| | | Percentage content (mass %) | 58.2 | 58.2 | 58.7 | 58.2 | 70.2 | 95.5 | 25.5 | 90 | 50 |
| | Aromatic monovinyl monomer unit | Type | ST | ST | ST | ST | ST | — | ST | ST | STMM |
| | | Percentage content (mass %) | 40 | 40 | 40 | 40 | 28 | — | 70 | 0.5 | 50 |
| | Acidic group-containing monomer unit | Type | VSA | IA | IA | IA | IA | MAA | MAA | MAA | — |
| | | Percentage content (mass %) | 0.8 | 0.8 | 0.8 | 0.8 | 0.8 | 3 | 3 | 8 | — |
| | Cross-linkable monomer unit | Type | EDMA | DVB | EDMA | EDMA | EDMA | AAm | AAm | AAm | — |
| | | Percentage content (mass %) | 1 | 1 | 0.5 | 1 | 1 | 1.5 | 1.5 | 1.5 | — |
| | Degree of swelling (factor) with respect to non-aqueous electrolysis solution | | 1.4 | 1.3 | 1.5 | 1.3 | 1.6 | 2.7 | 1.4 | 3.2 | 2.1 |
| | Glass-transition temperature (° C.) | | −12 | 4 | −10 | −8 | −44 | −67 | 15 | −50 | −40, 97 |
| | Contact angle with water (°) | | 100 | 106 | 106 | 104 | 81 | 88 | 130 | 75 | 127 |
| | Blended amount (parts by mass) per 100 parts by mass of non-conductive particles | | 8 | 8 | 8 | 8 | 8 | 8 | 8 | 8 | 8 |
| | Durability | | A | A | A | A | A | C | C | D | D |
| | Moisture content | | B | A | A | B | A | D | D | D | C |
| | Stability under high shear | | A | B | B | B | B | D | C | C | D |
| | Life characteristics | | B | A | B | A | A | D | C | D | C |
| | Output characteristics | | A | A | B | B | A | C | C | D | C |

The results in Table 1 demonstrate that in each of Examples 1-13 in which a particulate polymer was used that was a random copolymer including an alkyl (meth)acrylate monomer unit and an aromatic monovinyl monomer unit in specific percentages, and having a degree of swelling with respect to a non-aqueous electrolysis solution controlled to within a specific range, the composition for porous membrane-use containing the particulate polymer had excellent stability under high shear, the porous membrane had excellent durability and low moisture content, and the secondary battery had excellent life characteristics and output characteristics.

In contrast, the results in Table 1 also demonstrate that in each of Comparative Examples 1 and 3 in which the percentage content of the aromatic monovinyl monomer unit was low and the degree of swelling with respect to a non-aqueous electrolysis solution was high, the composition for porous membrane-use had poor stability under high shear, and the porous membrane had poor durability and high moisture content. The results in Table 1 also demonstrate that the secondary battery in each of Comparative Examples 1 and 3 had poor life characteristics and output characteristics.

Furthermore, the results in Table 1 demonstrate that in Comparative Example 2 in which the amount of the alkyl (meth)acrylate monomer unit was small and the amount of the aromatic monovinyl monomer unit was large, the composition for porous membrane-use had poor stability under high shear, and the porous membrane had poor durability. The results in Table 1 also demonstrate that the secondary battery in Comparative Example 2 had poor life characteristics and output characteristics.

Moreover, the results in Table 1 demonstrate that in Comparative Example 4 in which a particulate polymer was used that was a graft copolymer having a high degree of swelling with respect to a non-aqueous electrolysis solution, the composition for porous membrane-use had poor stability, and the porous membrane had poor durability and high moisture content. The results in Table 1 also demonstrate that the secondary battery in Comparative Example 4 had poor life characteristics and output characteristics.

The following observations can also be made from Table 1.

Examples 1-4, 7, 8, 12, and 14 demonstrate that stability under high shear of the composition for porous membrane-use and durability of the porous membrane can be improved, and the moisture content of the porous membrane can be reduced by adjusting the percentage contents of the alkyl (meth)acrylate monomer unit, the aromatic monovinyl monomer unit, the acidic group-containing monomer unit, and the cross-linkable monomer unit in the particulate polymer. These examples also demonstrate that life characteristics and output characteristics of the secondary battery can be improved in the same manner.

Examples 1, 5, 6, 9, 10, and 11 demonstrate that stability under high shear of the composition for porous membrane-use and durability of the porous membrane can be improved, and the moisture content of the porous membrane can be reduced by changing the types of the alkyl (meth)acrylate monomer unit, the aromatic monovinyl monomer unit, the acidic group-containing monomer unit, and the cross-linkable monomer unit in the particulate polymer. These examples also demonstrate that life characteristics and output characteristics of the secondary battery can be improved in the same manner.

Examples 1 and 13 demonstrate that stability under high shear of the composition for porous membrane-use can be improved and the moisture content of the porous membrane can be reduced by adjusting the blended amount of the particulate polymer relative to the non-conductive particles. These examples also demonstrate that output characteristics of the secondary battery can be improved in the same manner.

INDUSTRIAL APPLICABILITY

According to the present disclosure, it is possible to provide a binder for non-aqueous secondary battery porous membrane-use that enables formation of a porous membrane having excellent durability and that can improve stability under high shear of a composition for porous membrane-use.

Moreover, according to the present disclosure, it is possible to provide a composition for non-aqueous secondary battery porous membrane-use that has excellent stability under high shear and that enables formation of a porous membrane having excellent durability.

Furthermore, according to the present disclosure, it is possible to provide a porous membrane for non-aqueous secondary battery-use that has excellent durability and a non-aqueous secondary battery including the porous membrane for non-aqueous secondary battery-use.

The invention claimed is:

1. A binder for non-aqueous secondary battery porous membrane-use comprising
a particulate polymer, wherein
the particulate polymer is a random copolymer including at least 45 mass % of an alkyl (meth)acrylate monomer unit, at least 20 mass % and no greater than 50 mass % of an aromatic monovinyl monomer unit, and at least 0.5 mass % and no greater than 3 mass % of a cross-linkable monomer unit,
an alkyl (meth)acrylate monomer used to form the alkyl (meth)acrylate monomer unit is at least one selected from a group consisting of 2-ethylhexyl acrylate and octyl acrylate,
an aromatic monovinyl monomer used to form the aromatic monovinyl monomer unit is at least one selected from the group consisting of styrene, α-methylstyrene, vinyltoluene, and 4-(tert-butoxy)styrene,
a degree of swelling of the particulate polymer with respect to a non-aqueous electrolysis solution is greater than a factor of 1 and no greater than a factor of 1.8,
the particulate polymer has one glass-transition temperature,
the glass-transition temperature is no higher than 5° C.,
the contact angle with water of the particulate polymer is greater than 80° and no greater than 120°, and
the degree of swelling is measured using the non-aqueous electrolysis solution that is obtained by dissolving LiPF$_6$ as a supporting electrolyte with a concentration of 1 mol/L in a mixed solvent of ethylene carbonate, diethyl carbonate, and vinyl carbonate with volume mixing ratio of 68.5:30:1.5.

2. The binder for non-aqueous secondary battery porous membrane-use of claim 1, wherein
the particulate polymer further includes at least 0.1 mass % and no greater than 5 mass % of an acidic group-containing monomer unit.

3. The binder for non-aqueous secondary battery porous membrane-use of claim 2, wherein
an acidic group-containing monomer used to form the acidic group-containing monomer unit is an ethylenically unsaturated dicarboxylic acid.

4. The binder for non-aqueous secondary battery porous membrane-use of claim 1,
wherein the contact angle with water of the particulate polymer is greater than 80° and no greater than 110°.

5. A composition for non-aqueous secondary battery porous membrane-use comprising
the binder for non-aqueous secondary battery porous membrane-use of claim 1, non-conductive particles, and water.

6. A porous membrane for non-aqueous secondary battery-use formable from the composition for non-aqueous secondary battery porous membrane-use of claim 5.

7. A non-aqueous secondary battery comprising:
a positive electrode;
a negative electrode;
a separator; and
an electrolysis solution, wherein
the porous membrane for non-aqueous secondary battery-use of claim 5 is provided on a surface of at least one battery component selected from the group consisting of the positive electrode, the negative electrode, and the separator.

* * * * *